United States Patent [19]

Schulz et al.

[11] 4,105,753

[45] Aug. 8, 1978

[54] METHOD FOR SELECTIVE PRODUCTION OF BROMINE

[75] Inventors: Lothar Schulz, Bad Soden am Taunus; Hans-Jürgen Arpe, Fischbach, Taunus, both of Fed. Rep. of Germany

[73] Assignee: Hoechst Aktiengesellschaft, Frankfurt am Main; Fed. Rep. of Germany

[21] Appl. No.: 544,915

[22] Filed: Jan. 28, 1975

[30] Foreign Application Priority Data

Jan. 30, 1974 [DE] Fed. Rep. of Germany ....... 2404335

[51] Int. Cl.$^2$ ............ C01B 7/10; C01B 21/02
[52] U.S. Cl. ................... 423/502; 423/507; 423/351
[58] Field of Search ............ 423/481, 502, 507

[56] References Cited

U.S. PATENT DOCUMENTS

| 2,163,877 | 6/1939 | Hooker | 423/502 |
|---|---|---|---|
| 2,451,870 | 10/1948 | Richardson | 423/502 |
| 3,103,419 | 9/1963 | Hunter et al. | 423/507 |
| 3,383,177 | 5/1968 | Metaizeau | 423/502 |

FOREIGN PATENT DOCUMENTS 1,395,701  10/1968  France ..................... 423/502

OTHER PUBLICATIONS

Table of the Elements, Sargent-Welch, 1968, 2 pages.
Fritz Ephraim's book "Inorganic Chem.", 6th Ed. Rev. 1954, pp. 258 & 259, Interscience Publishers Inc., New York.

*Primary Examiner*—Edward Stern
*Attorney, Agent, or Firm*—Curtis, Morris & Safford

[57] ABSTRACT

A process for the preparation of bromine and hydrogen bromide, which comprises reacting ammonium bromide with an oxygen containing gas at temperatures of from 200° to 800° C in the presence of oxidation catalysts is disclosed. Catalysts based on platinum group metals favor formation of HBr. Most other metal catalysts cause chiefly formation of bromine.

16 Claims, No Drawings

METHOD FOR SELECTIVE PRODUCTION OF BROMINE

The present invention provides a process for the preparation of bromine and/or hydrogen bromide by oxidation of ammonium bromide with oxygen or oxygen containing gases.

Organic bromine compounds are important intermediate products for organic syntheses. For the case where ammonium bromide is formed during the reaction of these intermediate products, a process for the reconversion of ammonium bromide is very interesting.

It is possible to react bromide with low volatility acids, for example phosphoric or sulfuric acid, to form hydrogen bromide. However, if the salts obtained in this process cannot be profitably used, there is a problem of destroying these without pollution of the environment. Even in the case where a profitable utilization of the salts obtained is possible, this is seriously prejudiced by the necessity of a prepurification.

Also the processes for the preparation of bromine by reaction of metal bromides with hypochlorites or chlorine have the same disadvantages, since the corresponding chlorides are formed.

The present invention now provides a catalytic process which allows a simple and economic preparation of bromine and/or hydrogen bromide by oxidation of ammonium bromide with molecular oxygen, so that the cited problems of removal of by-products do not arise.

Oxidation processes are already known for some ammonium salts: according to Dutch Patent Application published under No. 7 202 714, ammonium hydrogen sulfate and ammonium sulfate may be oxidized with oxygen containing gases at temperatures of from 850° to 1250° C. Ammonium chloride may be oxidized in a two-step process: in the first step, ammonium chloride is reacted with stoichiometric amounts of transition metal oxides, in which reaction ammonia is set free. In the second step, the metal chlorides are oxidized with nitric acid or molecular oxygen, in which reaction chlorine is liberated. The two-step operation mode makes this process relatively expensive. Similar processes for the oxidation of ammonium bromide are unknown. It was therefore the object of the present invention to recover bromine or hydrogen bromide from $NH_4Br$ without using other chemical substances, especially expensive oxidation agents, and without simultaneous automatic formation of other salts.

In accordance with the present invention, a process is provided for the preparation of bromine and/or hydrogen bromide, which comprises reacting ammonium bromide with an oxygen containing gas at temperatures of from 200° to 800° C in the presence of oxidation catalysts. The oxidation catalysts contain metals having several valencies, or their compounds. Also elementary carbon may have a catalytic effect. Especially appropriate for the preparation of HBr are those metals which, in the absence of bromine compounds, catalyze the oxidation of $NH_3$ to NO. Also catalysts for the Deacon process may be advantageously used. Oxidation catalysts are for example listed in Ullmanns Encyklopadie der technischen Chemie, 3rd edition, 13, p. 99, and 15, p. 15.

Especially suitable catalysts contain copper, vanadium, uranium, thallium, rare earths or the elements of the 6th to 8th subgroup (VI B to VIIIB) of the Periodic Table. (Sanderson, Chemical Periodicity, New York, 1900, page 14, 1960.) By rare earths, there are to be understood the elements 57 to 71 of the Periodic Table.

It was surprising to observe that the single-step process of the invention can be carried out at relatively low temperature, so that no explosive bromine/nitrogen compounds and no toxic nitric oxides occur. The catalytically active metals may be used per se, in the form of alloys and/or compounds. Suitable compounds are for example oxides, mixed oxides, hydroxides and/or salts of the metals with inorganic acids, such as bromides, sulfates, phosphates, nitrates, carbonates, borates, salts of hetero-polyacids or inorganic complex compounds. Also organo-metal compounds or salts of the above metals with organic acids may be used for the preparation of the catalysts.

It is often advantageous to mix several catalytically active substances, to use them as united compound or to apply them together onto a carrier, thus prolonging the life and/or increasing the activity of the catalyst. Examples are cobalt-molybdate on aluminum oxide, ferrovanadate, mixtures of chromium oxide and ferric oxide or mixtures of copper and manganese compounds or rare earth compounds on silica gel.

It is also suitable to add compounds of the elements of the 1st to 4th main group (IA to IVA) of the Periodic Table and/or the elements of the 2nd to 4th subgroup (IIB to IVB), for example compounds of lithium, sodium, potassium, magnesium, calcium, barium aluminum, tin, zinc, cadmium, scandium, lanthanum, zirconium and titanium. As compounds, there may be used for example oxides, mixed oxides and/or salts of the metals with inorganic acids, for example bromides, sulfates, phosphates, carbonates, borates, salts of heteropolyacids or inorganic complex compounds. It is also possible to use salts of the above metals with lower carboxylic acids for the preparation of the catalysts. An addition of compounds of the 1st to 4th main group, especially of the 1st and 2nd main group, increases the stability of the catalyst, especially in the case of copper catalysts. An addition of the elements of the 2nd to 4th subgroup may increase an already given catalytic activity.

The above substances for the preparation of catalysts may also be mixed with inert material or applied onto carriers. Suitable carriers are for example aluminum oxide, silica gel, magnesium silicate, aluminum silicate, zeolites, pumice, titanium dioxide and technical ceramic materials as well as carbon containing substances such as charcoal, active carbon or coke.

The active substances may be applied onto the carrier one after the other or simultaneously, according to one of the usual processes, for example by impregnating the carrier with the solution of the metal compound, and subsequent drying; or precipitating the active substance in the presence of the carrier, for example by means of alkali, ammonia or a reduction agent. A further method for the preparation of the catalysts of the invention is the following: after impregnation of the carrier and, optionally, drying, the active substance is precipitated onto the surface of the carrier, for example by means of a reducing gas, by ammonia, or by treatment with alkali or a reducing agent.

Very finely distributed catalyst material may be converted before its use to a coarser form according to known methods (for example by compression molding).

The concentration of the catalytically active material on the carrier may widely vary. Generally, a concentration of from 0.05 to 20 weight % is advantageous, but it is also possible to operate successfully at a concentration above 20 weight %.

The concentration of the substances used for activation and/or stabilization may also widely vary; a molar ratio of promotor to catalyst of 0.1 : 10 is advantageous, but a higher or lower concentration ratio may also be chosen.

A high purity degree of the ammonium bromide used is not required, it may contain also substances inert under the reaction conditions.

The reaction conditions, that is, temperature and pressure, are not critical. Generally, the reaction temperature is in the range of from 200° to 800° C, preferably from 250° to 700° C, especially from 300° to 600° C. The reaction is carried out preferably under normal pressure, but operation under reduced or elevated pressure is also possible.

For the oxidation of the ammonium bromide, the oxygen or the oxygen containing gas may be mixed with gaseous ammonium bromide, and this mixture may be contacted with the catalyst in a manner usual for heterogeneously catalyzed gas reactions, for example in a solid, moving or fluidized bed.

The residence time is advantageously more than 0.1 seconds, especially advantageous are residence times of from 0.5 seconds to 5 minutes.

Vaporization of the ammonium bromide for loading the oxygen or the oxygen containing gas may be carried out according to usual industrial sublimation processes.

In order to counteract sintering of the ammonium bromide, it may be kept moving by mechanical devices or by means of a gas current. It is also possible to add inert materials such as glass, silicium dioxide, mineral or ceramic materials, to the ammonium bromide, or porous materials may be impregnated with ammonium bromide solution and, optionally, dried.

Temperatures in the vaporization vessel are advantageously from 250° C to the sublimation temperature of the ammonium bromide under the corresponding pressure, which, for example, is 400° C at 760 mm Hg.

An advantageous operation mode of the process of the invention is for example the following: the oxidizing gas is passed through a mixture of solid ammonium bromide and the catalyst of the invention, which mixture is heated to a temperature of from 200° C to the sublimation point of the ammonium bromide. Part of the heat liberated during the oxidation of the ammonium bromide is directly used for vaporizing further ammonium bromide, so that no heat exchanger is required.

The process may also be carried out continuously as follows:

$NH_4Br$ is introduced into the reaction zone consisting of $NH_4Br$ and catalyst at the same rate at which it is consumed. In this case, the ratio oxygen/consumed ammonium bromide may be very easily adjusted.

The ammonium bromide containing exhaust gases from this combined vaporization/reaction zone may be liberated from ammonium bromide in a subsequent condenser. Advantageously, these exhaust gases — optionally after additional dosage of further oxidizing gas — are contacted anew in one of the manners as described above with an oxidation catalyst according to the invention.

In a further embodiment of the invention, a mixture containing bromide ions and ammonium ions may be used in the vaporization vessel instead of $NH_4Br$; the simultaneous presence of oxidation catalysts being possible in this case. This embodiment is advantageous for example in those cases where ammonium salts of scarcely volatile acids, for example ammonium sulfate, are available and the sodium salt of these acids (such as $Na_2SO_4$) may be profitably utilized.

The reaction products of the process of the invention are bromine or hydrogen bromide or both. As by-products, nitrogen and water are obtained, and sometimes also nitrous oxide.

The following reaction equations apply approximately:

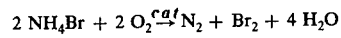

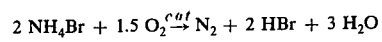

The selectivity of the catalytic oxidation may be influenced within a wide range:

Bromine is formed with high selectivity when catalysts are used which contain copper, rare earths, vanadium, chromium, molybdenum, uranium, manganese, iron and/or cobalt. These catalysts, also in the case of oxygen deficiency, yield practically only bromine and nearly no HBr. There is an oxygen deficiency in the case where less oxygen than theoretically required for the formation of bromine is introduced. However, this definition has a sense only in the case where catalyst and $NH_4Br$ are not mixed. When the formation of hydrogen bromide is intended, there are advantageously used catalysts which contain rhenium and/or noble metals of the 8th subgroup (especially Ru, Rh, Ir, Pt) in elementary form and/or as compounds and/or elementary carbon. The selectivity is increased when the oxygen excess is only small.

Generally, these catalysts yield HBr in all cases where the following equation is valid:

$$S/N \leq 1$$

in which

S is the molar amount of oxygen introduced into the reactor per unit of time, and N is the molar amount of ammonium bromide oxidized in the reaction vessel per unit of time or leaving the reactor in unreacted state.

At S/N data substantially above 1, nearly pure bromine is obtained using carbon, the selectivity of Re and the platinum group metals being influenced only scarcely in this case. The S/N ratio may be reduced by increasing the temperature of the ammonium bromide in the sublimation zone (increased vaporization of $NH_4Br$) or decreasing the partial pressure of the oxygen (for example by replacing oxygen by air); and it may be increased by increasing the rate of flow (since in this case the $NH_4Br$ saturation degree of the oxidizing gas decreases because of the finite vaporization speed). Thus, the vapor pressure of ammonium bromide is for example 220 mm Hg at 350° C, $NH_4Br$ being nearly completely dissociated into HBr and $NH_3$. When pure oxygen is used and $O_2$ is completely saturated with $NH_4Br$ (saturation degree = 1), according to the above equation S/N = 4.9 is obtained at a total pressure of 760 mm Hg. When, however, a gas having an oxygen content of 21% is used as oxidation agent, while the other conditions remain constant, S/N = 1.0 is obtained according to the above equation.

When the saturation degree is decreased from 1.0 to 0.5, for example by increasing the rate of flow in the vaporization zone or by adding further oxygen or air behind the vaporization zone, the S/N values are increased to 9.8 and 2.0, respectively.

When catalyst and ammonium bromide are mixed, the following rule is valid: the higher the temperature adjusted in the combined reaction/vaporization zone and the lower the oxygen partial pressure in the oxidizing gas, the lower the S/N value (all other conditions remaining constant).

The S/N value may also depend on the catalyst. Because of the increased conversion rate, a more active catalyst will reduce the S/N value.

In order to prevent contamination of the reaction products by possibly unreacted ammonium bromide, the latter is optionally condensed at temperatures above the dew point of the aqueous phase of the reaction mixture.

Bromine and/or hydrogen bromide may be separated from the reaction gases according to usual methods, for example by condensation, washing with solvents, or adsorption. The bromine and/or hydrogen bromide containing reaction product may also be used directly for further reactions.

In the case where hydrogen bromide is formed as undesireable by-product, it may be recycled into the process, optionally after addition of further oxygen or oxygen containing gas. However, such recycling generally will not be necessary, since the process of the invention allows to prepare bromine as well as hydrogen bromide with a practically 100% selectivity.

After removal of water, bromine and/or hydrogen bromide from the reactor exhaust gas, the nitrous oxide formed in this process may also be profitably utilized (after elemination of $N_2$).

Even the nitrogen formed may be profitably utilized. If this is intended, the use of air or a nitrogen/oxygen mixture enriched with nitrogen as oxidizing gas is recommended.

Without the use of oxidation catalysts, there is only poor formation of bromine and hydrogen bromide from $NH_4Br$.

The following Examples illustrate the invention.

EXAMPLE 1

150 g of active aluminum oxide having a grain size of from 20 to 100 μm, a bulk density of 0.96 g/cm³, a specific pore volume of 0.5 cm³/g and a specific surface of 190 m²/g were impregnated with a solution of 22.5 g of copper(II) bromide in 99 ml of water, dried and heated for 2 hours at 400° C in an oxygen current. A glass tube placed in an electric stove and having an inner width of 23 mm contained 150 g of ammonium bromide mixed with 20 ml of glass Raschig rings, and on top of this mixture, separated by a glass wool layer having a thickness of 2 cm, there were 30 ml of the above catalyst. The tube was heated to about 300° to 340° C, and simultaneously, 10 Nl/h of air (N = normal, that is, under normal conditions of 0° C to 760 mm Hg) were passed through the tube from bottom to top, which heated the catalyst to 340° to 430° C. The gases leaving the reactor were passed through a condenser having a temperature of about 100° C, in order to separate possibly unreacted ammonium bromide, subsequently through two cooling traps having a temperature of 0° C and −60° C, respectively, and a washing bottle containing potassium bromide solution of 0° C for intense washing. The amount of the bromine and hydrogen bromide formed was evaluated from the condensates of the cooling traps and the contents of the washing bottle, and the gas leaving the washing bottle was analyzed to evaluate the amount of oxygen, nitrogen and nitrous oxide.

Under the above conditions, no ammonium bromide precipitated in the condenser. 6.0 g/h of bromine and about 0.3 g/h of hydrogen bromide were formed. The exhaust gas contained from 88 to 95% of nitrogen and about 0.5% of nitrous oxide ($N_2O$).

EXAMPLE 2

The catalyst described in Example 1 was used in the form of moldings having a diameter of about 4 mm.

The apparatus used in Example 1 was charged with a mixture of 100 g of ammonium bromide and 16.5 g of catalyst, and a layer of 2 cm of glass wool and 30 g of the same catalyst were placed onto this mixture. At a stove temperature of about 330°-350° C and an oxygen current of about 5 Nl/h, a temperature of from 330° to 370° C established itself in the ammonium bromide/catalyst mixture, while the temperature in the catalyst zone on top of this mixture rose to 340°-370° C.

Within 4.5 hours, 56.2 g of bromine and less than 0.2 g of hydrogen bromide were formed. The condenser was free from ammonium bromide.

EXAMPLE 3

The method of Example 2 was repeated, but instead of oxygen, air was used.

The temperature in the ammonium bromide/catalyst mixture adjusted itself to about 330°-350° C, while in the zone charged with the catalyst a maximum temperature of about 360° C was observed.

3.7 g/h of bromine were formed, and the exhaust gas contained 98.6% of nitrogen and about 0.3% of nitrous oxide. In the condenser having a temperature of about 100° C, there was precipitation of ammonium bromide.

EXAMPLE 4

After a 20 hour treatment with an aqueous solution of 160 g of copper (II) sulfate-pentahydrate, 70 g of a synthetic zeolite in the form of little rods having a diameter of 1.6 mm (composed according to the formula $Na_2OAl_2O_3 \cdot 2\text{-}3\ SiO_2$) and a pore diameter of about 1 nm was washed with water until no copper was detected any more in the washing water. Subsequently, the catalyst was dried at 120° C and 8 mm Hg. The operations of Example 1 were repeated, using 30 g of the above catalyst; the tube containing ammonium bromide and catalyst, through which about 6 Nl/h of oxygen were passed, being heated to about 330°-350° C. In the catalyst zone, the temperature rose to 360°-450° C. The vaporized ammonium bromide was completely converted, and 2.5 g/h of bromine were obtained.

EXAMPLE 5

100 g of pumice gravel were treated with an excess of a 20% aqueous solution of $Cu(NO_3)_2 \cdot 3\ H_2O$, filtered, dried and tempered for 2 hours at 400° C in an oxygen current. The operations of Example 1 were repeated, using 30 ml of the above catalyst and 200 g of ammonium bromide, at a stove temperature of about 340°-360° C and an oxygen current of about 10 Nl/h. At a catalyst temperature of a maximum of 450° C, 31.8 g of bromine and 1.7 g of hydrogen bromide were obtained within 5.5 hours.

EXAMPLE 6

84 g of a commercial titanium dioxide catalyst carrier in the form of moldings were treated with an excess of a 20% solution of $Cu(NO_3)_2 \cdot 3 H_2O$, filtered, dried and tempered for 2 hours at 400° C in an oxygen current.

The operations of Example 1 were repeated, using 30 ml of the above catalyst and 150 g of ammonium bromide. At a stove temperature of 340°–360° C and an oxygen current of about 10 Nl/h, 43 g of bromine and 4 g of hydrogen bromide were obtained within 5.5 hours.

EXAMPLE 7

The catalyst was prepared as indicated in Example 1, but only 0.5 g of copper (II) bromide were used per 100 g of carrier.

The operations of Example 1 were repeated, using 46 g of the above catalyst. At a stove temperature of about 310°–340° C, an oxygen current of 10 Nl/h and a maximum catalyst temperature of 380° C, 14.5 g of bromine and less than 0.2 g of hydrogen bromide were obtained within 5.5 hours. The exhaust gas contained less than 0.1% of nitrous oxide.

EXAMPLE 8

A solution of 5 g of ammonium metavanadate in 90 ml of water was added to 100 g of silica gel having a grain size of 0.1–0.3 mm, a bulk density of 0.4 g/cm$^3$, a specific pore volume of 1 cm$^3$/g and a specific surface of 300 m$^2$/g, and after a one hour drying on a steam bath and a one hour drying at 130° C in vacuo, the catalyst was tempered for 2 hours at 450° C in an oxygen current.

The operations of Example 1 were repeated, using 20 g of the above catalyst and passing through about 5 Nl/h of air. At a stove temperature of about 350° C and a catalyst temperature of 360°–400° C, 1.6 g/h of bromine were formed. There was precipitation of ammonium bromide in the condenser having a temperature of about 100° C.

EXAMPLE 9

100 g of the carrier used in Example 8 were impregnated with 95 ml of an aqueous solution of 5 g of chromium trioxide and, after drying, tempered for 2 hours at 400° C in an oxygen current.

The conversion was carried out as indicated in Example 1, using 12 g of the above catalyst. At an oxygen current of about 5.5 Nl/h and a stove temperature of 340°–370° C, the temperature in the catalyst zone rose to 520° C. 6.6 g of bromine were formed per hour. No ammonium bromide precipitated in the condenser having a temperature of about 100° C.

EXAMPLE 10

A commercial catalyst composed of 10% of zinc oxide and 10% of chromium (III) oxide on activated aluminum oxide, having a specific surface of 141 m$^2$/g and a specific pore volume of 0.28 cm$^3$/g, and being present in the form of tablets having a diameter of about 3 mm was tempered for 2 hours at 400° C in an oxygen current.

The operations of Example 1 were repeated, using 21 g of this catalyst. At an oxygen current of about 5 Nl/h, a stove temperature of about 340°–370° C and a temperature of 510° C in the catalyst zone, 7.5 g of bromine and 1.3 g of hydrogen bromide per hour were formed. The exhaust gas contained about 20% of nitrous oxide.

EXAMPLE 11

A solution of 1.3 g of phosphoric acid, 13 g of MoO$_3$ and 5 ml of concentrated aqueous ammonia in 100 ml of water was precipitated at boiling temperature with 100 ml of concentrated nitric acid. The precipitate was dissolved in 20 ml of concentrated ammonia and 70 ml of water, and 100 g of the carrier used in Example 8 were impregnated with this solution, subsequently dried and tempered for 2 hours at 400° C in an oxygen current.

The operations of Example 1 were repeated using 30 ml of the above catalyst. At about 9 Nl/h of oxygen and a stove temperature of about 330°–350° C, 2.8 g/h of bromine were formed.

EXAMPLE 12

A solution of 4.5 g of manganese (II) nitrate in 90 ml of water was added to 100 g of the carrier used in Example 8, gassed with ammonia after short drying, dried in vacuo at 130° C for one hour and heated for 2 hours at 450° C in an oxygen current.

The operations of Example 1 were repeated, using 18.4 g of the above catalyst. At a stove temperature of 330°–350° C, about 5 Nl/h of oxygen and a catalyst temperature of 360°–400° C, 1.5 g/h of bromine were obtained.

EXAMPLE 13

The operations of Example 1 were repeated, using 40 g of a commercial catalyst in the form of granules having a diameter of about 4 mm, composed of 91.6% of Fe$_2$O$_3$ and 8.2% of Cr$_2$O$_3$ and having a specific surface of 132 m$^2$/g.

At an oxygen current of about 5 Nl/h and a stove temperature of about 340°–360° C, 5 g of bromine were obtained per hour. No ammonium bromide precipitated in the condenser having a temperature of about 100° C.

EXAMPLE 14

A commercial catalyst in the form of tablets containing 3.5% of cobalt (II) oxide and 10% of molybdenum (VI) oxide on aluminum oxide was tempered for 2 hours at 400° C in an oxygen current.

The operations of Example 1 were repeated, using 40 g of this catalyst, at about 5 Nl/h of air and a stove temperature of about 330°–350° C. The catalyst temperature rose to 400° C, and 1.6 g of bromine were obtained per hour. Ammonium bromide precipitated in the condenser having a temperature of about 100° C.

EXAMPLE 15

50 g of the carrier used in Example 8 were impregnated with an aqueous solution of 3 g of thallium (I) nitrate and, after drying, tempered for 2 hours at 400° C in an oxygen current.

The conversion was carried out as indicated in Example 1, using 20 g of the above catalyst. At a stove temperature of about 330°–350° C and an oxygen current of about 5 Nl/h, 1 g/h of bromine were obtained. Ammonium bromide precipitated in the condenser having a temperature of about 100° C.

EXAMPLE 16

100 g of the silica gel used in Example 8 were impregnated with 8 g of uranyl nitrate in the manner as described in the cited Example and tempered in an oxygen current.

The operations of Example 1 were repeated using 20 g of the above catalyst; 5 Nl/h of air being used instead of oxygen. At a stove temperature of about 330°–350° C and a catalyst temperature of 360°–410° C, 1.9 g/h of bromine were formed. Ammonium bromide precipitated in the condenser having a temperature of about 100° C.

EXAMPLE 17

50 g of the carrier used in Example 8 were impregnated with a solution of 5 g of didymium oxide*) in 45 ml of dilute nitric acid and, after drying at 110° C, gassed with ammonia, while the temperature was slowly raised to 400° C. Subsequently, the catalyst was tempered for 2 hours in an oxygen current.

*)Didymium oxide is a product a Pechiney-St.Gobain which is composed of a mixture of neodyminum oxide and praseodymium oxide and small amounts of samarium, lanthanum and cerium in the oxides.

The operations of Example 1 were repeated using 30 ml of the above catalyst. At about 9 Nl/h of oxygen and a stove temperature of about 330°–350° C, 1.8 g/h of bromine were formed.

EXAMPLE 18

100 g of a commercial, active, granulated aluminum oxide consisting of 90% of $Al_2O_3$, 1.6% of $Na_2O$, 0.13% of $Fe_2O_3$ and 2.2% of $SiO_2$, loss at red heat of 6% and specific surface of 390 m$^2$/g, were impregnated with a solution of 4.84 g of rhenium heptoxide and 0.8 g of sodium hydroxide in 70 ml of water, filtered and, after drying in vacuo, tempered for 4 hours at 400° C in an oxygen current.

The operations of Example 1 were repeated using 24.5 g of the above catalyst. At a stove temperature of about 330°–350° C and an oxygen current of about 9 Nl/h, 8 g of bromine and 12 g of hydrogen bromide were obtained within 5.5 hours.

EXAMPLE 19

50 g of the carrier used in Example 8 were impregnated with a solution of 3.9 g of ruthenium (III) chlorohydrate (containing 38.8% of Ru) in 45 ml of water and, after drying, tempered for 2 hours in an oxygen current.

The operations of Example 2 were repeated, using a mixture of 40 g of ammonium bromide and 8.0 g of the above catalyst, on which mixture a layer of 18.9 g of the ruthenium catalyst was superposed. The stove was heated to about 330°–360° C. Using an oxygen current amount of about 5 Nl/h, the catalyst temperature rose to a maximum of 520° C. After 6 hours, all ammonium bromide was consumed, and 31 g of bromine were obtained.

EXAMPLE 20

The operations of Example 1 were repeated, using 150 g of ammonium bromide and 17.8 g of a commercial catalyst, consisting of aluminum oxide with 5% of rhodium. At a stove temperature of about 330°–350° C and an oxygen current of about 9 Nl/h, 15.8 g of bromine were obtained within 3 hours.

EXAMPLE 21

50 g of the carrier used in Example 1 were impregnated in the manner as described in the cited Example with 5 g of hexachloro-iridic acid (containing 37.8% of iridium), and tempered in an oxygen current.

The operations of Example 1 were repeated using 20 g of the above catalyst. At an oxygen current amount of about 5 Nl/h and a stove temperature of about 330°–360° C, 4.9 g of bromine and 0.3 g of hydrogen bromide per hour were obtained.

EXAMPLE 22

The operations of Example 1 were repeated, using 9 g of a commercial catalyst consisting of 5% of platinum in the form of metal on aluminum oxide. At a stove temperature of about 330°–360° C and an oxygen current of about 10 Nl/h and a maximum catalyst temperature of 500° C, 25.4 g of bromine and 4.5 g of hydrogen bromide were obtained within 5 hours. The exhaust gas contained about 0.3% of nitrous oxide.

EXAMPLES 23 to 29

100 g each of the carrier described in Example 8 were impregnated with the substances listed in Table 1 in 90 ml of water. The first drying was carried out at 100° C and normal pressure, the second at 120° C and 10 mm Hg. Subsequently, the catalysts were tempered for 2 hours at 400° C in an oxygen current.

The reactions were carried out as described in Example 1, using a mixture of 200 g of ammonium bromide and 40 ml of glass Raschig rings which mixture was superposed by 30 ml of the catalyst. At a stove temperature of about 330°–360° C, about 10 Nl/h of oxygen were passed through.

After completed tests, the catalysts were divided into single layers which were quantitatively analyzed with respect to their content of copper. Test conditions and results are listed in Table 2.

Table 1

| Active substances for the preparation of catalysts | | |
|---|---|---|
| Example No. | Active substances per 100 g $SiO_2$ carrier | |
| 23 | 15 | g Cu $Br_2$ |
| 24 | 10.5 | g $Cu(NO_3)_2 \cdot 3 H_2O$ |
|  | 2.3 | g LiOH in $HNO_3$ |
| 25 | 10.0 | g Cu $Br_2$ |
|  | 10.7 | g K Br |
| 26 | 15.3 | g $Cu(NO_3)_2 \cdot 3 H_2O$ |
|  | 42.8 | g $Mg(NO_3)_2 \cdot 6 H_2O$ |
| 27 | 15.3 | g $Cu(NO_3)_2 \cdot 3 H_2O$ |
|  | 8.0 | g $Ba(NO_3)_2$ |
| 28 | 15.3 | g $Cu(NO_3)_2 \cdot 3 H_2O$ |
|  | 22.9 | g $Mn(NO_3)_2 \cdot 4 H_2O$ |
| 29 | 15.3 | g $Cu(NO_3)_2 \cdot 3 H_2O$ |
|  | 10 | g Zn dust in $NHO_3$ |

EXAMPLE 30

10 g of didymium oxide were dissolved in a small amount of nitric acid, and the whole was made up with water to 90 ml. After 100 g of the carrier described in Example 8 were impregnated with this solution and after drying, the catalyst was gassed with ammonia at room temperature and subsequently tempered for 1 hour in a nitrogen current. The catalyst was then impregnated with 90 ml of a solution of 15.3 g of Cu(NO$_3$)$_2 \cdot$ 3 H$_2$O and 10 g of KBr. The further treatment of the catalyst as well as the subsequent reaction of ammonium bromide with oxygen in the presence of this catalyst was carried out as described in Examples 23 to 29. The result is listed in Table 2.

EXAMPLE 31

100 g of the carrier described in Example 8 were impregnated with 90 ml of a 15% aqueous $TiCl_3$ solution, dried, and gassed with ammonia; the temperature being slowly raised from room temperature to 150° C.

The catalyst was washed with water until it was free from chloride, and, after drying, impregnated with 90 ml of an aqueous solution of 15.3 g of Cu(NO$_3$)$_2$ . 3 H$_2$O. The further treatment of the catalyst as well as the subsequent reaction of ammonium bromide with oxygen in the presence of this catalyst was carried out as described in Examples 23 to 29. The result is listed in Table 2. After scrubbing the exhaust gas to liberate it from bromine and hydrogen bromide, the gas contained about 12% of nitrous oxide.

EXAMPLE 32

100 g of the carrier described in Example 8 were impregnated with 95 ml of an aqueous solution of 15 g of tin(II) chloride and 20 ml of concentrated hydrochloric acid, dried in vacuo and gassed with ammonia at temperatures being slowly raised from room temperature to 200° C. The catalyst was washed with water to liberate it from chloride, dried in vacuo and impregnated with 15.3 g of copper (II) nitrate-trihydrate in 90 ml of aqueous solution. The further treatment of the catalyst as well as the subsequent reaction of ammonium bromide with oxygen in the presence of this catalyst was carried out as described in Examples 23 to 29. The result is listed in Table 2.

EXAMPLE 33

20 g of NaH$_2$PO$_4$ . 2 H$_2$O in 100 ml of water were added to a solution of 24 g of Cu(NO$_3$)$_2$ . 3 H$_2$O in 200 ml of water, the precipitate was washed in the centrifuge with 100 ml of water, and 100 g of the carrier described in Example 1 were impregnated with the ammoniacal solution (66 ml) of this precipitated. The further treatment of the catalyst as well as the subsequent reaction of ammonium bromide with oxygen in the presence of this catalyst was carried out as described in Examples 23 to 29. The result is listed in Table 2.

EXAMPLE 34

The reaction process as described in Examples 23 to 29 was repeated, using 30 g of the catalyst described in Example 1. The result is listed in Table 2.

EXAMPLES 35 to 44

The apparatus used in Example 1 was charged with a mixture of ammonium bromide, catalyst and Raschig rings and heated for 2 hours in a stove having a temperature of about 330°–350° C, while about 10 Nl/h of oxygen were passed through. The amounts charged and the conversion rates of ammonium bromide are listed in Table 3.

The catalysts of Examples 35, 37, 41 and 44 were prepared in analogy to the catalysts of Examples 23 to 29, using the following substances:

EXAMPLE 35

15 g of Cu(NO$_3$)$_2$ . 3 H$_2$O in 90 ml of aqueous solution, 100 g of the silica gel used in Example 8.

EXAMPLE 37

15 g of Cu(NO$_3$)$_2$ . 3 H$_2$O, 20 g of Ce(NO$_3$)$_3$ . 6 H$_2$O, in 90 ml of aqueous solution, 100 g of the silica gel used in Example 8.

EXAMPLE 38

10 g of didymium oxide in 90 ml of dilute HNO$_3$, 100 g of the silica gel used in Example 8. After drying, the catalyst was gassed with ammonia at temperatures rising up to 400° C, and subsequently impregnated with 15 g of Cu(NO$_3$)$_2$ . 3 H$_2$O in 90 ml of aqueous solution. The further treatment was carried out as described above.

EXAMPLE 41

10 g of copper(II) formate in 66 ml of aqueous solution, 100 g of the aluminum oxide used in Example 1.

EXAMPLE 44

10 g of CuSO$_4$ . 5 H$_2$O in 66 ml of aqueous solution, 100 g of the aluminum oxide used in Example 1.

All catalysts yielded bromine in a practically 100% selectivity, relative to ammonium bromide.

Table 2

Oxidation of ammonium bromide with different copper catalysts.

| Example No. | Test time h | Conversion rate NH$_4$Br g/h | Yield Br$_2$ % of the theor. yield | max. cat. temp. °C | % Cu in catalyst after completed test in inferior layer | % Cu in catalyst after completed test in superior layer |
|---|---|---|---|---|---|---|
| 23 | 4 | 12 | 95 | 520 | 0.5 | 3.8 |
| 24 | 5 | 10 | 98 | 520 | 1.9 | 2.7 |
| 25 | 5.25 | 11 | 100 | 540 | 2.5 | 2.5 |
| 26 | 5 | 11 | 96 | 500 | 2.1 | 3.3 |
| 27 | 5.5 | 11 | 99 | 530 | 1.8 | 3.3 |
| 28 | 5.5 | 10 | 97 | 540 | 3.5 | 3.6 |
| 29 | 5.5 | 10 | 99 | 490 | 1.7 | 2.9 |
| 30 | 5.5 | 10 | 99 | 490 | 3.3 | 3.4 |
| 31 | 5.5 | 10 | 90 | 490 | 3.8 | 3.8 |
| 32 | 5.5 | 10 | 80 | 500 | 1.2 | 4.0 |
| 33 | 5.5 | 8 | 100 | 450 | 1.1 | 1.2 |
| 34 | 5 | 8 | 97 | 490 | 3.6 | 3.6 |

Table 3

Oxidation of NH$_4$Br/catalyst mixtures with oxygen

| Example No. | Preparation of catalyst | Catalyst (g) | NH$_4$Br (g) | Conversion rate NH$_4$Br (g) |
|---|---|---|---|---|
| 35 [1)] | see text | 10.0 | 150 | 14.0 |
| 36 [1)] | as in Example 28 | 10.0 | 150 | 20.7 |
| 37 [1)] | see text | 10.0 | 150 | 31.7 |
| 38 [1)] | see text | 9.3 | 143 | 28.3 |

Table 3-continued

Oxidation of $NH_4Br$/catalyst mixtures with oxygen

| Example No. | Preparation of catalyst | Catalyst (g) | $NH_4Br$ (g) | Conversion rate $NH_4Br$ (g) |
|---|---|---|---|---|
| 39 [1] | as in Example 30 | 10.2 | 158 | 26.5 |
| 40 [1] | as in Example 2 | 15.0 | 150 | 25.3 |
| 41 | see text | 10.0 | 150 | 15.2 |
| 42 | copper(I)-bromide | 10.0 | 150 | 13.2 |
| 43 | as in Example 13 | 22.7 | 150 | 18.3 |
| 44 | see text | 10.0 | 150 | 15.7 |

[1] These examples allow a comparison of the activity of the different copper catalysts.

EXAMPLE 45

The reaction tube of the apparatus described in Example 1 was charged with a mixture of 34.3 g of sodium bromide, 44.0 g of ammonium sulfate and 15 ml of Raschig rings. On top of this mixture, separated by a layer of glass wool, 70 g of sodium bromide in admixture with 15 ml of Raschig rings were introduced, and, after a further layer of glass wool, 30 ml of the catalyst described in Example 28. At an oxygen current amount of about 10 Nl/h, the tube was slowly heated from about 340° C to about 410°–450° C within 4 hours, and the latter temperature was maintained constant for one hour.

The reaction product contained 13 g of bromine.

EXAMPLE 46

The operations of Example 1 were repeated, using 30 ml of commercial broken coke, crushed to a particle size of about 3–4 mm, as catalyst. However, a mixture of 75 g of ammonium bromide and about 15 ml of Raschig rings was superposed by a mixture of 75 g of ammonium bromide and catalyst.

At a stove temperature of about 330°–335° C and an oxygen current of about 5.5 Nl/h, 3.6 g of bromine and less than 0.2 g of hydrogen bromide were obtained within 5 hours.

EXAMPLE 47

The operations of Example 46 were repeated, using 30 ml of carbon black in the form of pearls having an ash content of 0.02%, a mean particle size of 25 nm and a specific surface of 110 m²/g, which was mixed with 75 g of ammonium bromide and 15 ml of Raschig rings.

At a stove temperature of about 330°–350° C and about 5.5 Nl/h of air, 8 g of bromine and 4 g of hydrogen bromide were obtained within 5 hours.

EXAMPLE 48

As catalyst, there was used an active charcoal prepared from mineral coal having a specific surface of about 1000 m²/g, a specific pore volume of 0.85 cm³/g a maximum ash content of 8% and a grain size of about 1.5 mm.

The operations of Example 46 were repeated using 30 ml of the above catalyst. At a stove temperature of about 330°–355° C and an air current of about 5.5 Nl/h, 24.4 g of ammonium bromide were converted to hydrogen bromide within 5 hours in a 100% selectivity. Besides nitrogen and noble gases, the exhaust gas contained about 0.5% of $O_2$, about 1% of $CO_2$ and less than 0.1% of $N_2O$ and CO.

EXAMPLE 49

The operations of Example 1 were repeated, using 30 ml of the catalyst described in Example 48. Additives for loosening and catalyst were arranged in 3 layers; below was a mixture of 60 g of ammonium bromide and 15 ml of Raschig rings, in central position a mixture of 40 g of ammonium bromide and 10 ml of catalyst, and on top 20 ml of the unmixed catalyst.

At a stove temperature of about 380° C, an oxygen current of about 5.5 Nl/h and a catalyst temperature of a maximum of 510° C, 29 g of hydrogen bromide were obtained within 80 minutes. No elementary bromide was detected in the reaction product, and ammonia precipitated in the condenser.

EXAMPLE 50

50 g of the carrier used in Example 8 were impregnated with a solution of 3.9 g of ruthenium(III) chloride-hydrate (containing 38.8% of Ru) in 45 ml of water and, after drying, tempered for 2 hours at 400° C in an oxygen current.

The operations of Example 1 were repeated, using 20 g of the above catalyst. At a stove temperature of about 320°–350° C, an air current of 5 Nl/h and a catalyst temperature of about 450° C, 45.6 g of hydrogen bromide and 1.5 g of bromine were obtained within 12 hours. The exhaust gas contained from 0 to 3% of oxygen. A small amount of ammonium bromide precipitated in the condenser.

EXAMPLE 51

The operations of Example 1 were repeated, using 17.8 g of a commercial catalyst containing 5% of Rh on aluminum oxide. At a stove temperature of about 330°–350° C and an amount of air of about 5 Nl/h, the catalyst temperature rose to a maximum of 480° C. Within 5 hours, 6.5 g of hydrogen bromide were obtained. No bromine was detected in the reaction product. Ammonium bromide precipitated in the condenser.

EXAMPLE 52

The operations of Example 1 were repeated, using 20 ml of a commercial catalyst consisting of 5% of platinum on silica gel. At a stove temperature of about 340°–360° C and an amount of air of about 5 Nl/h, the catalyst temperature rose to a maximum of 420° C. Within 4.5 hours, 9.8 g of hydrogen bromide and 0.8 g of bromine were obtained. Ammonium bromide precipitated in the condenser. The exhaust gas contained from 0 to 2% of oxygen.

EXAMPLE 53

The operation of Example 1 was repeated, using 30 g of the catalyst used in Example 18. At a stove temperature of about 320°–370° C and an amount of air of about 5 Nl/h, the catalyst temperature rose to a maximum of 460° C. Within 4 hours, 16.3 g of hydrogen bromide free from elementary bromine were obtained. A decrease of catalyst activity was not observed during the reaction time.

EXAMPLE 54

100 g of the carrier described in Example 8 were impregnated with 5 g of rhenium heptoxide in 90 ml of water and, after drying, tempered for 2 hours at 400° C in an oxygen current.

The operations of Example 1 were repeated, using 20 g of the above catalyst. At a stove temperature of about 330°–360° C and an oxygen current of about 5 Nl/h, 7.4 g of hydrogen bromide and 1.2 g of bromine were obtained within 5.5 hours. A rhenium containing deposit formed in the condenser, and the catalyst activity dropped considerably during the test.

EXAMPLE 55

The operations of Example 1 were repeated, using 30 ml of the catalyst described in Example 21. At a stove temperature of about 330°–360° C and an air current amount of about 5 Nl/h, 26.7 g of ammonium bromide were oxidized to hydrogen bromide in a 100% selectivity within 5 hours. The exhaust gas was practically free from oxygen. Ammonium bromide precipitated in the condenser.

What is claimed is:

1. A process for the selective production of bromine directly from ammonium bromide which consists essentially of contacting ammonium bromide and an oxygen containing gas with an inorganic oxidation catalyst containing at least one element selected from the group consisting of copper, vanadium, chromium, molybdenum, uranium, manganese, iron, cobalt and rare earth elements of atomic numbers 57 to 71, and mixtures thereof, reacting said ammonium bromide and oxygen in the presence of said catalyst at about ambient pressure and a temperature of from 200° to 800° C and a reaction time of more than 0.1 second to produce a reaction gas product consisting essentially of bromine, nitrogen and $H_2O$, and recovering the bromine from said gaseous reaction product.

2. The process of claim 1 wherein the catalyst contains additionally at least one compound of an element of the first to fourth main group and the second to fourth subgroup of the Periodic Table.

3. The process of claim 1 wherein the catalyst is used on a carrier in elementary form or as a compound.

4. The process of claim 1 wherein the reaction is carried out at a temperature of from 250° to 700° C.

5. The process of claim 1 wherein the reaction is carried out at a temperature from 300° to 600° C.

6. The process of claim 1 wherein the reaction is carried out in 0.5 second to 5 minutes.

7. The process of claim 1 wherein an oxygen containing gas is passed through a mixture of ammonium bromide and catalyst.

8. The process of claim 1 wherein a gaseous mixture of ammonium bromide and an oxygen containing gas are passed over the catalyst.

9. The process of claim 1 wherein the oxidation catalyst is a member selected from the group consisting of chromium and molybdenum.

10. The process of claim 1 wherein the oxidation catalyst is a member selected from the group consisting of iron and cobalt.

11. The process of claim 1 wherein the oxidation catalyst comprises copper.

12. The process of claim 1 wherein the oxidation catalyst comprises manganese.

13. A process for the selective production of bromine directly from ammonium bromide which consists essentially of contacting ammonium bromide and an oxygen containing gas with an inorganic oxidation catalyst containing at least one element selected from the group consisting of copper, vanadium, chromium, molybdenum, manganese, cobalt, thallium, uranium, didymium oxide and mixtures thereof, reacting said ammonium bromide and oxygen in the presence of said catalyst at about ambient pressure and a temperature of from 300° to 600° C and a reaction time of 0.5 second to 5 minutes to produce a reaction gas product consisting essentially of bromine, nitrogen and $H_2O$, and recovering the bromine from said gaseous reaction product.

14. The process of claim 13 wherein the oxidation catalyst comprises thallium.

15. The process of claim 13 wherein the oxidation catalyst comprises uranium.

16. The process of claim 13 wherein the oxidation catalyst comprises didymium oxide.

* * * * *